(12) United States Patent
Zheng et al.

(10) Patent No.: US 8,047,682 B2
(45) Date of Patent: Nov. 1, 2011

(54) LED STREET LAMP ASSEMBLY

(75) Inventors: Shi-Song Zheng, Shenzhen (CN); Li He, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 677 days.

(21) Appl. No.: 12/168,904

(22) Filed: Jul. 8, 2008

(65) Prior Publication Data

US 2009/0267525 A1 Oct. 29, 2009

(30) Foreign Application Priority Data

Apr. 28, 2008 (CN) .......................... 2008 1 0066699

(51) Int. Cl.
*F21S 4/00* (2006.01)
*F21V 21/00* (2006.01)
*F21V 11/00* (2006.01)

(52) U.S. Cl. ......... 362/249.05; 362/249.01; 362/249.02; 362/249.03; 362/249.04; 362/249.06; 362/368; 362/370; 362/431

(58) Field of Classification Search .......... 362/640–659, 362/249.01–249.18, 368, 370, 431
See application file for complete search history.

(56) References Cited

U.S. PATENT DOCUMENTS

| | | | | | |
|---|---|---|---|---|---|
| 3,949,842 | A | * | 4/1976 | Kiehn | 362/390 |
| 3,959,645 | A | * | 5/1976 | Patry | 362/431 |
| 6,250,774 | B1 | * | 6/2001 | Begemann et al. | 362/231 |
| 2006/0044800 | A1 | * | 3/2006 | Reime | 362/276 |
| 2009/0040750 | A1 | * | 2/2009 | Myer | 362/183 |

FOREIGN PATENT DOCUMENTS

| | | |
|---|---|---|
| CN | 87201316 | 9/1987 |
| CN | 2289320 | 8/1998 |
| CN | 2869562 | 2/2007 |
| CN | 1967347 | 5/2007 |
| CN | 101101103 | 1/2008 |

* cited by examiner

*Primary Examiner* — William Carter
(74) *Attorney, Agent, or Firm* — Altis Law Group, Inc.

(57) ABSTRACT

An LED street lamp assembly includes a central member having a first LED module fixed to a top surface thereof, a plurality of lamps attached to circumference of the central member and each having a second LED module therein, a plurality of sensors each mounted in one of the lamps and a controlling and driving circuit board received in the central member for receiving signal sent out by the sensors. If there is a goer approaches the LED street lamp assembly, the sensors are activated to send out signal to the controlling and driving circuit board to turn on the second LED modules of the lamps one by one as the goer comes closer and closer. If the goer passes by and is going away from the LED street lamp assembly, the sensors stop sending out signal to the control and driving circuit board to switch off the second LED module of the lamps one by one as the goer goes away farther and farther.

15 Claims, 5 Drawing Sheets

US 8,047,682 B2

LED STREET LAMP ASSEMBLY

CROSS-REFERENCES TO RELATED APPLICATION

This application is related to U.S. patent application Ser. No. 12/051,856 filed on Mar. 20, 2008 and entitled "LED LAMP ASSEMBLY"; the co-pending U.S. patent application is assigned to the same assignee as the instant application. The disclosure of the above-identified application is incorporated herein by reference.

BACKGROUND OF THE INVENTION

1. Field of the Invention

The present invention relates to an LED lamp assembly for a lighting purpose, and more particularly relates to an improved LED lamp assembly having an intelligent controlling function, good heat dissipation capability and large illumination area.

2. Description of Related Art

An LED lamp is a type of solid-state lighting that utilizes light-emitting diodes (LEDs) as a source of illumination. An LED is a device for transferring electricity to light by using a theory that, if a current is made to flow in a forward direction through a junction region comprising two different semiconductors, electrons and holes are coupled at the junction region to generate a light beam. The LED has an advantage that it is resistant to shock, and has an almost eternal lifetime under a specific condition; thus, the LED lamp is intended to be a cost-effective yet high quality replacement for incandescent and fluorescent lamps.

Since LED lamps have many advantages, the LED lamps often act as street lamps for lighting purpose. Generally, the LED street lamps have two using states, for example, they either completely turn on or turn off. Once turning on, the LED street lamps will continuously provide constant illuminant intensity even if there are no any goers or vehicles under the LED street lamps, which leads to waste of electrical energy.

What is needed, therefore, is an improved LED street lamp assembly which can overcome the above problems.

SUMMARY

An LED street lamp assembly, includes a central member having a first LED module fixed to a top surface thereof, a plurality of lamps attached to a circumference of the central member and each having a second LED module therein, a plurality of sensors each mounted in one of the lamps and a controlling and driving circuit board received in the central member for receiving signal sent out by the sensors. If there is a goer approaches the LED street lamp assembly, the sensors are activated to send out signal to the controlling and driving circuit board to turn on the second LED modules of the lamps one by one as the goer comes closer and closer. If the goer passes by and is going away from the LED street lamp assembly, the sensors stop sending out signal to the control and driving circuit board to switch off the second LED modules of the lamps one by one as the goer goes away farther and farther.

Other advantages and novel features of the present invention will become more apparent from the following detailed description of an embodiment/embodiments when taken in conjunction with the accompanying drawings, in which:

DETAILED DESCRIPTION

Figure 1:
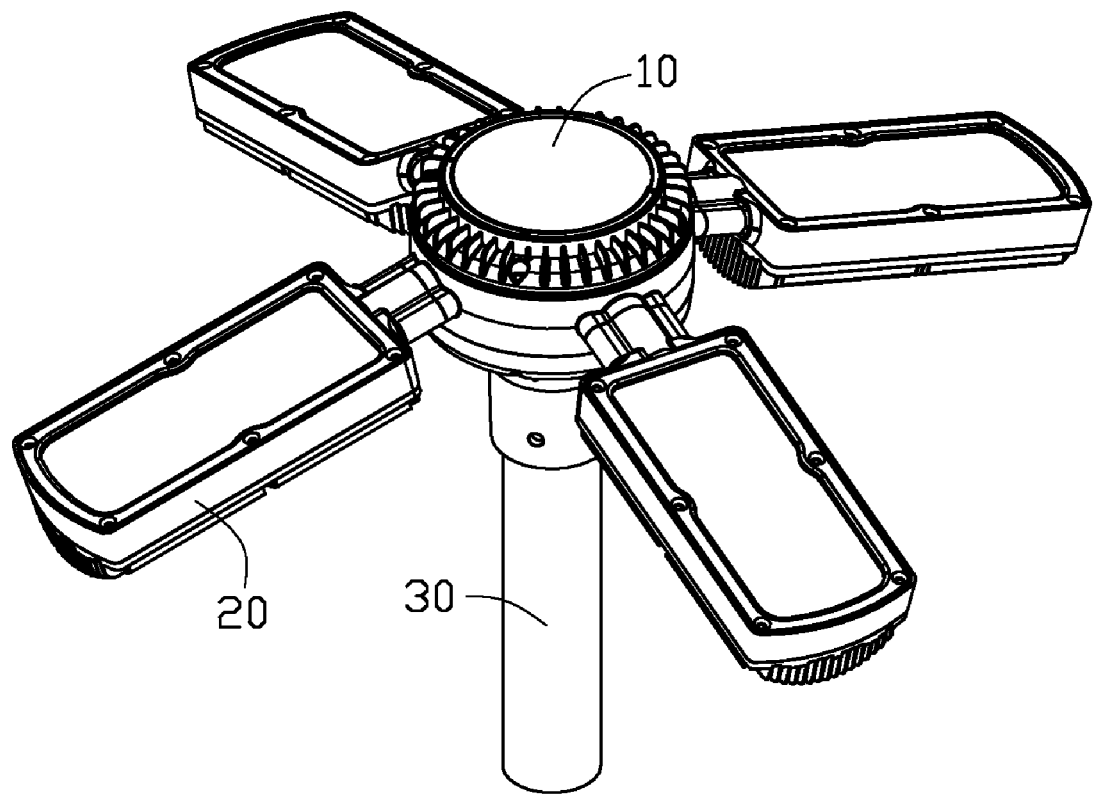
FIG. 1 is an isometric, assembled view of an LED street lamp assembly in accordance with a preferred embodiment of the present invention.
Figure 2:
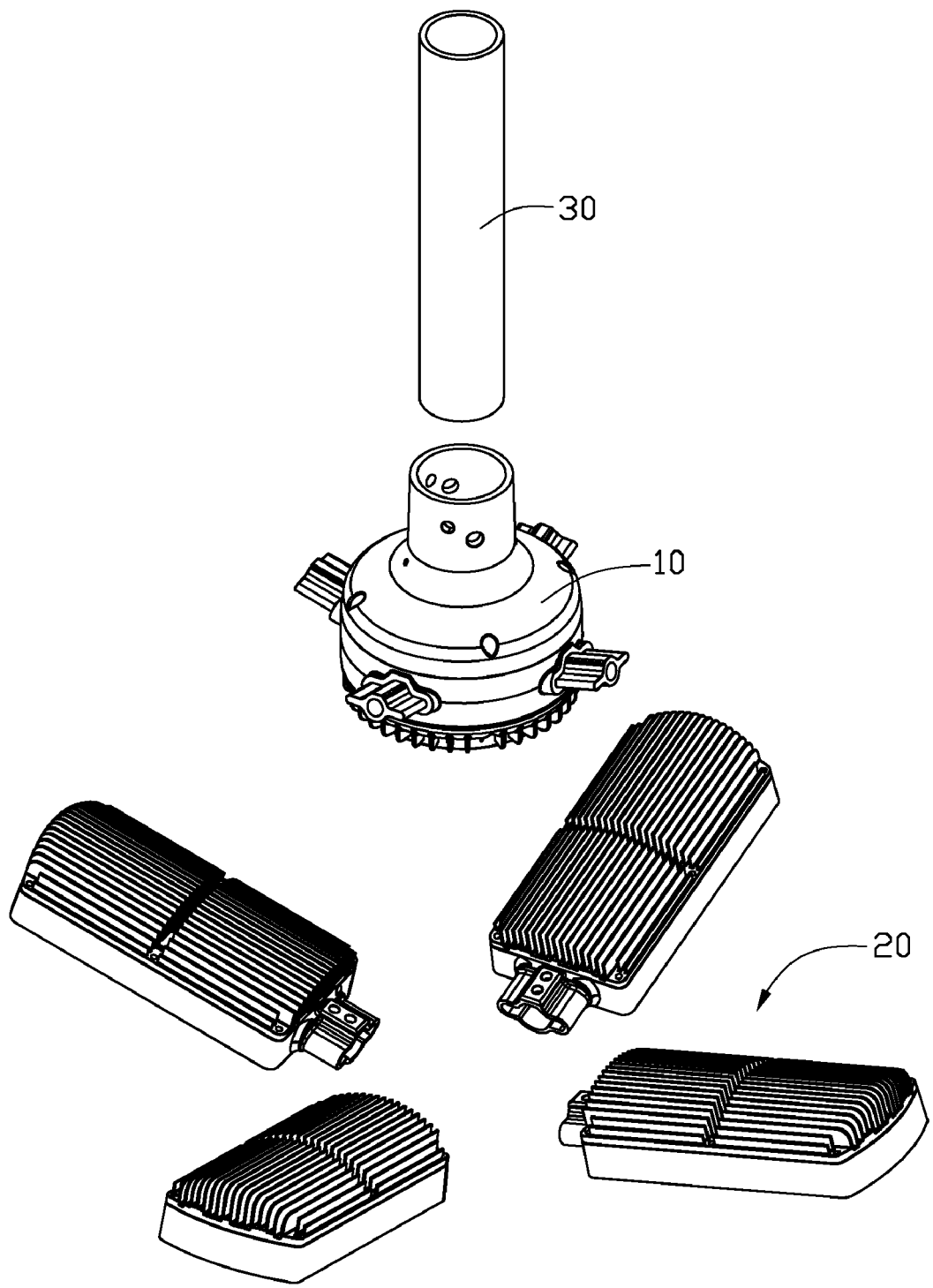
FIG. 2 is an inverted, exploded view of FIG. 1.

Referring to FIGS. 1-2, an LED street lamp assembly in accordance with a preferred embodiment is illustrated. The LED street lamp assembly comprises a central member 10 and four lamps 20 evenly attached to a circumference of the central member 10. The LED street lamp assembly can be held at a predetermined position by a supporting post 30 engaging with the central member 10. In this embodiment, the supporting post 30 extends upwardly to support the lamps 20.

Figure 3:
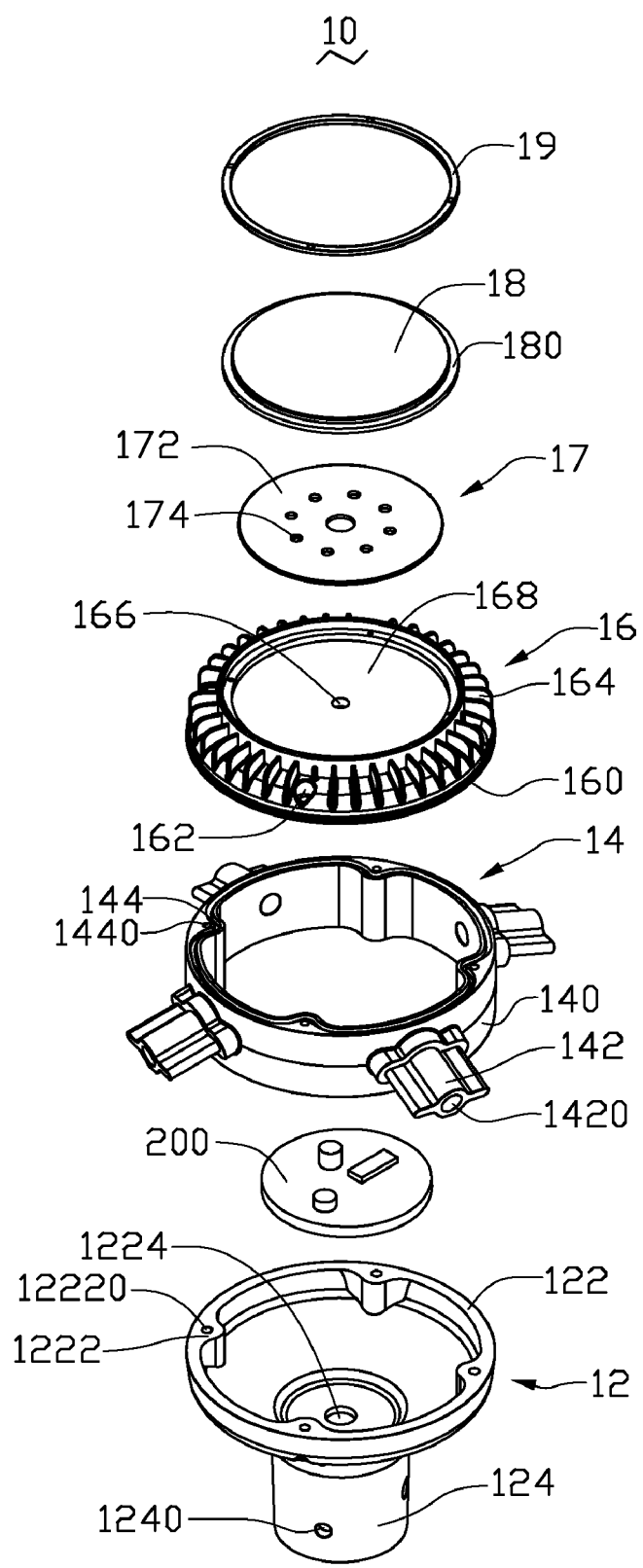
FIG. 3 is an exploded view of a central member of the LED street lamp assembly in FIG. 1.

Particularly referring to FIG. 3, the central member 10 comprises a base 12, a top cover 16, a connecting part 14 sandwiched between and interconnecting the base 12 and the top cover 16, a first LED (light-emitting diode) module 17 fixed to a top surface of the top cover 16, a lens 18 and a retaining ring 19 for fixing the lens 18 onto the top cover 16. The base 12 has a bowl-shaped body 122 and a sleeve 124 extending downwardly from a central portion of a bottom of the bowl-shaped body 122. The bowl-shaped body 122 is provided with four vertical fixing protrusions 1222 evenly located at inner side of a sidewall thereof. Each of the fixing protrusions 1222 defines a through hole 12220 therein. Each of the through holes 12220 is provided for upward extension of a screw (not shown) therethrough to screw into the connecting part 14 to securely couple the base 12 and the connecting part 14 together. The bowl-shaped body 122 in a centre of the bottom thereof defines a bore 1224 communicating with the sleeve 124 for lead wires (not shown) to extend upwards therethrough to electrically connect with the lamps 20. The sleeve 124 is configured to receive the supporting post 30 therein and defines a plurality of locking holes 1240 in a circumferential sidewall thereof. The locking holes 1240 are provided for allowing a plurality of bolts (not shown) inserted therein to securely lock the base 12 to the supporting post 30.

The connecting part 14 is integrally made of a metal with good heat conductivity such as copper and aluminum and is configured for assembling all members of the LED street lamp assembly together. The connecting part 14 comprises a tube-shaped sidewall 140 and four inserting extrusions 142 extending outwardly and symmetrically from an outer side of the sidewall 140. The sidewall 140 has a caliber identical to that of the bowl-shaped body 12. Corresponding to the four fixing protrusions 1222 of the base 12, the sidewall 140 is provided four engaging protrusions 144 symmetrically located in an inner side thereof. Each of the engaging protrusions 144 defines an engaging hole 1440 therein for threadedly receiving the screw (not shown) which extends upwardly through the base 12 and a screw (not shown) which extends downwards through the top cover 16. Each of the inserting extrusions 142 is configured to secure one of the lamps 20 and can have different configurations in different embodiments. In this embodiment, each of the inserting extrusions 142 is configured to have a central rod (not labeled) and two plate-shaped shoulders (not labeled) connecting with two opposite lateral sides of the central rod. The two shoulders are in the same level with each other. The inserting extrusions 142 are centrosymmetrical to each other relative to an axis of the tube-shaped sidewall 140. Each of the inserting extrusions 142 is slightly downwardly slantwise to the sidewall 140 and defines an extending hole 1420 in the central portion thereof for the lead wires to extend therethrough to electrically connect with the lamps 20.

The top cover 16 is integrally made of a metal block with good heat conductivity such as copper and aluminum, and has a circular top plate 160 covering on a top of the connecting part 14 and a plurality of fins 164 arranged on a periphery of a top surface of the top plate 160. The top plate 160 has a diameter similar to the caliber of the tube-shaped sidewall 140 of the connecting part 14 and defines four mounting holes 162 adjacent to a rim thereof. The mounting holes 162 are corresponding to the engaging holes 1440 of the connecting part 14 for allowing screws (not shown) to extend through the mounting holes 162 to engage into the engaging holes 1440 of the connecting part 14. The mounting plates 162 defines a circular receiving part 168 in a centre of the top surface thereof. The receiving part 168 recesses downwardly from the top surface of the top cover 16, has a flat top surface on which the first LED module 17 is mounted and defines a bore 166 in a centre thereof for an upwards extension of lead wires therethrough to electrically connect with first LED module 17. The fins 164 surrounding the receiving part 168, are perpendicular to the top plate 160 and extend outwardly and radially from a circular central portion of the top plate 160.

The first LED module 17 includes a circular printed circuit board 172 and a plurality of LEDs 174 mounted on the circular printed circuit board 172. The LEDs 174 are arranged on the circular printed circuit board 172 in a symmetrical form. The lens 18 is in a circular plate-shaped configuration and has a size fit for being properly received in the receiving part 168 of the top cover 16 to cover the first LED module 17.

In assembly of the central member 10, the base 12, the connecting part 14 and the top cover 16 are assembled together by the screws. The retaining ring 19 is interferingly fixed in to an annular groove formed between inner sidewall of the receiving part 168 of the top cover 16 and a rim of the lens 18 to securely hold the lens 18 in the receiving part 168. A rectifier (not shown) is hermetically received in the connecting part 14. Heat generated by the first LED module 17 and the rectifier 100 is absorbed by the top plate 160 and then dissipated into air via the fins 164 of the top cover 16.

Figure 4:
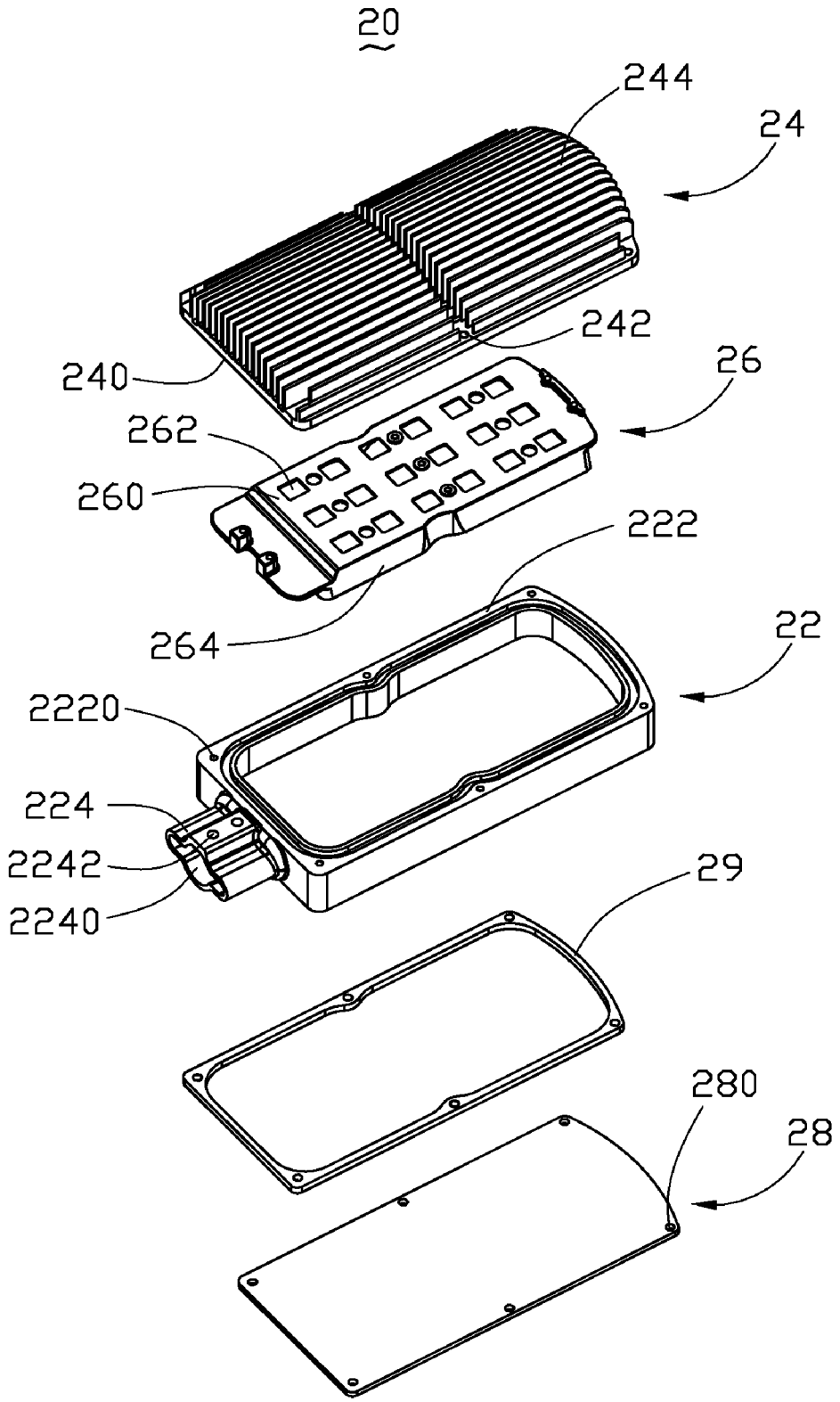
FIG. 4 is an exploded view of a lamp of the LED street lamp assembly in FIG. 2.
Figure 5:
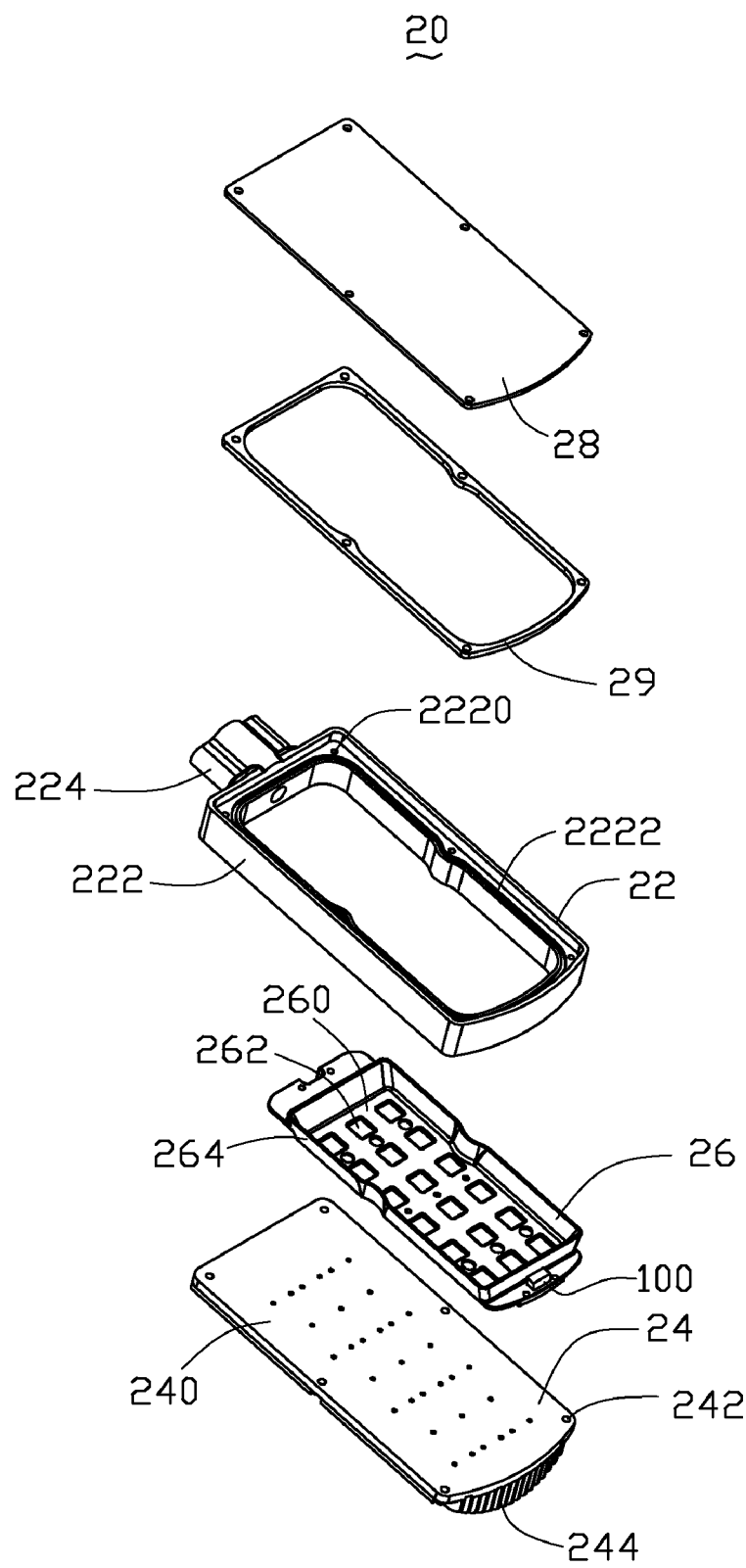
FIG. 5 is an inverted view of FIG. 4.

As shown in FIG. 4, the lamp 20 comprises a supporting frame 22, a heat sink 24 covering on a bottom of the supporting frame 22, a second LED module 26 attached to a top surface of the heat sink 24 and accommodated in the supporting frame 22, a transparent/translucent cover 28 attached to a top of the supporting frame 22 and a rectangular, ring-shaped seal 29 sandwiched between the bottom of the supporting frame 22 and the cover 28 for preventing rainwater or dust from creeping into a space defined by the supporting frame 22 to cause the second LED module 26 to have short circuit or contaminate the second LED module 26. The supporting frame 22 is integrally made of a metal block with good heat conductivity such as copper and aluminum, and comprises a rectangular frame part 222 and an engaging tube 224 extending horizontally from a lateral side of the frame part 222. The frame part 222 consists of a pair of parallel long beams (not labeled) and a pair of parallel short beams (not labeled) connected together. Each of the long beams in a top and bottom surface thereof defines a plurality of engaging orifices 2220 (also referring to FIG. 5) respectively located at middle and two opposite ends thereof. The engaging orifices 2220 are configured for engaging with screws (not shown) that extend through the heat sink 24 and the cover 28 to couple the cover 28 and the heat sink 24 respectively to the top and the bottom of the supporting frame 22. The frame part 222 defines a receiving groove 2222 in the top thereof along the beams for receiving the seal 29. The engaging tube 224 extends outwardly and perpendicularly from a middle of one of the short beams. A hollow hole 2240 is formed in the engaging tube 224 for receiving one of the inserting extrusions 142 of the central member 10 therein. Two locking orifices 2242 are defined in a bottom of the engaging tube 224 for allowing bolts (not shown) inserted therein to lock the engaging tube 224 with the inserting extrusion 142 of the central member 10.

The heat sink 24 is integrally made of a metal block with good heat conductivity such as copper and aluminum, and comprises a covering plate 240 and a plurality of fins 244 arranged on a bottom surface of the covering plate 240. The covering plate 240 is rectangular and has a configuration that it can appropriately cover the top of the supporting frame 22. Corresponding to the engaging orifices 2220 in the bottom of the supporting frame 22, a plurality of through orifices 242 are provided in the covering plate 240 for allowing screws (not shown) to extend upwardly therethrough to screw into the engaging orifices 2220. The fins 244 are apart from each other, parallel to two opposite long sides of the covering plate 240 and have heights decreased gradually from a middle toward the two opposite long sides of the covering plate 240.

The second LED module 26 is attached to a top surface of the covering plate 240 of the heat sink 24 and enclosed by the frame part 222. The second LED module 26 comprises a rectangular circuit board 260, a plurality of LEDs 262 mounted on the circuit board 260 and a reflecting flange 264 extending upwardly and obliquely from a periphery of the printed circuit board 260 to surround the LEDs 262.

The cover 28 is made of transparent/translucent plastic or glass and in the form of a rectangular plate. The cover 28 defines therein a plurality of through orifices 280 for allowing screws (not shown) to extend therethrough to screw into the engaging orifices 2220 in the top of the supporting frame 22 to thereby couple the cover 28 to the top of the supporting frame 22. The seal 29 is received in the receiving groove 2222 of the supporting frame 22 and is pressed downwardly by the cover 28.

In assembly of the lamp 20, the cover 28 and the heat sink 24 are coupled respectively to the top and bottom of the supporting frame 22 by the screws, thereby hermetically enclosing the second LED module 26 in the lamp 20.

In use of the LED street lamp assembly, the LED street lamp assembly is suspended by the supporting post 30. The four lamps 20 are assembled to the circumference of the central member 10 by the four inserting extrusions 142 of the central member 10 being respectively inserted into the four engaging tubes 224 of the four lamps 20. The LED street lamp assembly is held by the supporting post 30 with the first and second LED modules 17, 26 of the lamps 20 facing downwardly toward ground (i.e., a position inverted from what shown in FIG. 1). The lamps 20 are tilted upwardly from the central member 10 along a radially outward direction. As the lamps 20 are disposed surrounding the central member 10, every sides of the LED street lamp assembly are sufficiently illuminated, whereby the LED street lamp assembly can provide a large illumination area. When the second LED module 26 is activated to generate light, a mass of heat generated by the LEDs 262 is simultaneously absorbed by the cover plate 240 of the heat sink 24 to be dissipated into the air via the fins 244, whereby the second LED module 26 is cooled duly and timely, and the LEDs 262 can thus function normally.

To minimize a power consumption of the LED lamp assembly, the LED street lamp assembly is provided with an infrared/sound control sensor 100 in each of the lamps 20 and a controlling and driving circuit board 200 in the central member 10 for receiving signal from the sensors 100 to switch the lamps 20 on or off to provide illumination with different intensity according to actual need. When there is not a goer near the LED street lamp assembly, no signal is sent to the controlling and driving circuit board 200 to activate the lamps 20; thus, all of the lamps 20 are turned off excepts the first LED module 17 of the central member 10 is on work. When there is a goer approaches to the LED street lamp assembly, the sensor 100 of one of the lamps 20 which is closest to the goer is activated to send out a signal to the controlling and driving circuit board 200 to turn on the lamp 20 closest to the goer. As the goer comes closer and closer to the LED street lamp assembly, the sensors 100 of the other lamps 20 are activated to send out signal to the controlling and driving circuit board 200 to turn on the other lamps 20 one by one after the closest one of the lamps 20 is turned on. As the goer passes by and goes farther and farther away from the LED street lamp assembly, the sensor stop sending out signals, by which the lamp 20 which is turned on firstly and farthest from the goer is turned off firstly, the other lamps 20 are then turned off one by one. Thus a waste of electrical energy is prevented.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An LED street lamp assembly, comprising:
    a central member having a first LED module fixed to a top surface thereof;
    a plurality of lamps attached to a circumference of the central member and each having a second LED module therein;
    a plurality of sensors each mounted in one of the lamps; and
    a controlling and driving circuit board received in the central member for receiving signal sent out by the sensors;
    wherein when there is a goer approaches the LED street lamp assembly, the sensors are activated to send out signal to the controlling and driving circuit board to turn on the second LED modules of the lamps one by one as the goer comes closer and closer to the lamp assembly, and when the goer passes by and goes away from the LED street lamp assembly, the sensors stop sending out signal to the controlling and driving circuit board to switch off the second LED modules of the lamps one by one as the goer goes away from the lamp assembly farther and farther;
    wherein when the goer is approaching, the lamp nearest to the coming goer is turned on firstly, and when the goer is going away, the lamp turned on firstly is firstly switched off;
    wherein the central member has a plurality of inserting extrusions formed at a circumference thereof, a receiving tube projecting from an end of each of the lamps and engagingly receives one of the inserting extrusions to fix the lamp onto the circumference of the central member; and
    wherein each of the lamps comprises a supporting frame, a heat sink covering an opening of the supporting frame, the second LED module being attached to the heat sink and accommodated in the supporting frame.

2. The LED street lamp assembly as claimed in claim 1, wherein the first LED module of the central member is always turned on.

3. The LED street lamp assembly as claimed in claim 1, wherein the lamps are tilted upwardly from the central member along a radially outward direction, and each of the inserting extrusions has a central rod and two plate-shaped shoulders that are connected to two opposite lateral sides of the central rod, the shoulders being in the same level with each other.

4. The LED street lamp assembly as claimed in claim 3, wherein the central member comprises a base, a top cover and a connecting part sandwiched between and connecting the base and the top cover.

5. The LED street lamp assembly as claimed in claim 4, wherein the base has a bowl-shaped body and a sleeve extending from a central portion of the bowl-shaped body, and the sleeve securely receives a supporting post to hold the LED street lamp assembly in position.

6. The LED street lamp assembly as claimed in claim 4, wherein the connecting part comprises a tube-shaped sidewall, and the inserting extrusions are formed on a circumference of the sidewall.

7. The LED street lamp assembly as claimed in claim 4, wherein the top cover comprises a circular top plate covering an opening of the connecting part and a plurality of fins formed on the top plate.

8. The LED street lamp assembly as claimed in claim 7, wherein the fins are perpendicular to the top plate and extend outwardly, surrounding the first LED module and extending radially from a circular central portion of the top plate.

9. The LED street lamp assembly as claimed in claim 1, wherein the heat sink comprises a covering plate covering a lower opening of the frame part and a plurality of fins arranged on a bottom surface of the covering plate.

10. The LED street lamp assembly as claimed in claim 9, wherein the supporting frame comprises a rectangular frame part having a pair of parallel long beams and a pair of parallel short beams, and the receiving tube is projected from an outer side of one of the short beams.

11. The LED street lamp assembly as claimed in claim 1, wherein the fins are apart from each other and parallel to two opposite long sides of the covering plate and have heights decreased gradually from a middle toward the two opposite long sides of the covering plate.

12. The LED street lamp assembly as claimed in claim 1, wherein the second LED module comprises a rectangular circuit board, a plurality of LEDs mounted on the circuit board and a reflecting flange extending from the circuit board and surrounding the LEDs.

13. The LED street lamp assembly as claimed in claim 1, wherein each of the lamps further comprises a cover opposite the heat sink and covering the opening of the supporting frame.

14. The LED street lamp assembly as claimed in claim 13, wherein the frame is further provided with a seal sandwiched between the supporting frame and the cover.

15. The LED street lamp assembly as claimed in claim 14, wherein a receiving groove is formed in the supporting frame for receiving the seal therein.

* * * * *